Dec. 15, 1953 P. E. HEAL 2,662,295
GAUGE

Filed Dec. 22, 1950 2 Sheets-Sheet 1

INVENTOR.
PAUL E. HEAL
BY Edward H Lang
ATTORNEY

Dec. 15, 1953     P. E. HEAL     2,662,295
GAUGE
Filed Dec. 22, 1950     2 Sheets-Sheet 2
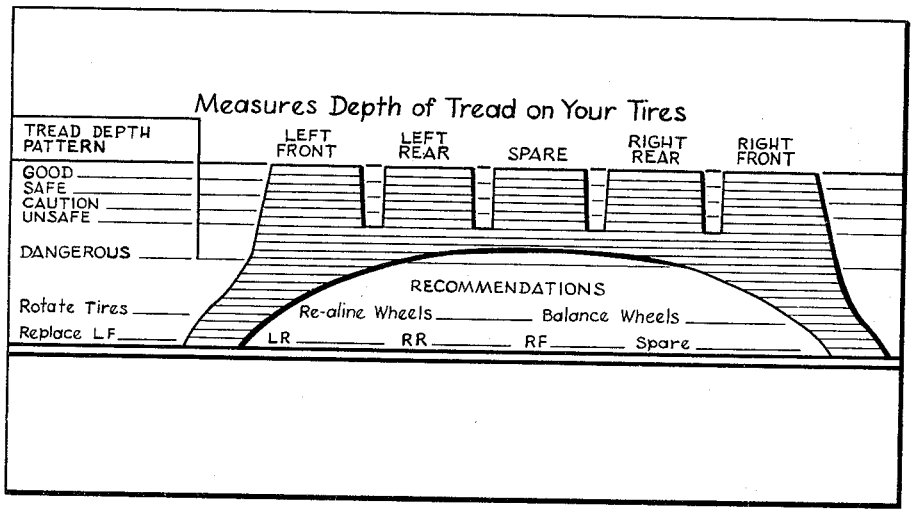
FIG. 7
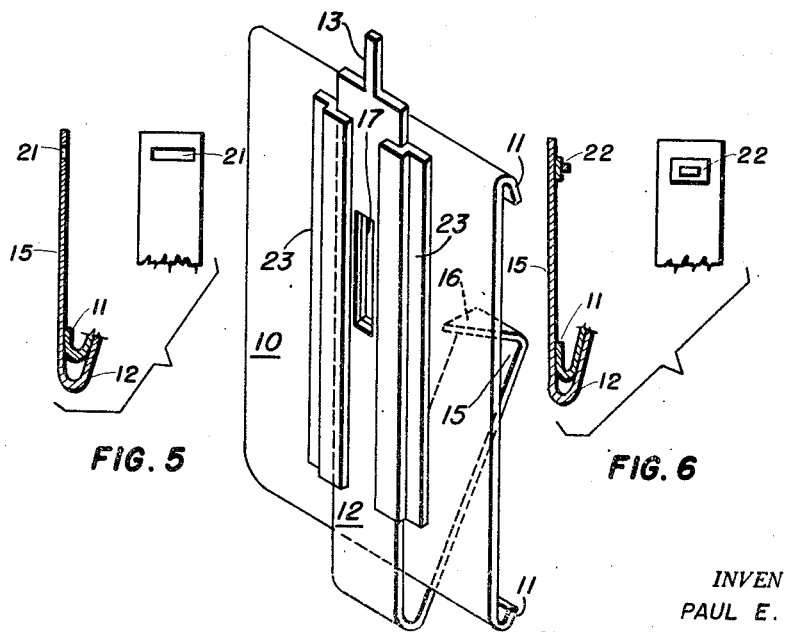
FIG. 5     FIG. 6
FIG. 8
INVENTOR.
PAUL E. HEAL
BY Edward H. Lang
ATTORNEY Patented Dec. 15, 1953

2,662,295

UNITED STATES PATENT OFFICE 2,662,295

GAUGE

Paul E. Heal, Chicago, Ill., assignor to The Pure Oil Company, Chicago, Ill., a corporation of Ohio Application December 22, 1950, Serial No. 202,328

9 Claims. (Cl. 33—169)

This invention relates to a device for measuring the depth of cavities, holes, or other recesses or depressions in a body. More particularly, it relates to a combination of measuring and recording elements in a depth measuring gauge.

Instruments that have been developed for application in the art of measuring have been numerous in the kind and quantity depending upon their specific use. The more refined apparatus usually have incorporated in their design as an integral part thereof a scale calibrated and suitably graduated in linear measurements that correspond to the limits of application of the instrument. An indicator is slidably mounted on the scale in such a manner that the position of the indicator in relation to the face of the scale converts the dimension of the measurement, which is provided by the indicating elements of the apparatus and transmitted thereto, directly into a specific relative quantity. Due to the fact that it is necessary to manipulate manually the gauge in its operation the cooperating elements of the instrument must be so fitted that the mensuration may be carried out with a minimum of effort. In addition when the measurement has been made it is generally necessary to remove the gauging device from the area where the measurement was made in order to determine readily by reference to the indicating scale the conversion of spatial extent into corresponding linear units of measurement. This combination of free movement of the cooperating elements of the instrument and the transfer from the scene of the measurement to a position where the results evinced may be interpreted facilitate the evolution of inaccuracies which may inadvertently make themselves manifest by accidental jarring of the instrument or other disturbances which efface the original relationship of the cooperating parts of the device which was provided by the defining limits of the subject of the measurement. Even if this latter aspect does not obtain, the fallibility of the operator may provide errors in reading the results shown by the instrument and/or recording these results. Various improvements have been suggested in the art to alleviate these shortcomings such as positive locking devices to prevent inadvertent displacement of the elements of the instrument after the measurement has been completed thereby preventing the former objections and auxiliary mechanical, electromechanical, or electrical devices for transcribing the results produced by the measuring instrument thereby overcoming the human error. There is not presently available a measuring instrument which is simple in its manipulation and economical in its production which will perform the functions of a measuring device without having the foregoing disadvantages. However my invention incorporates inventive factors of design which forestall or minimize the possibilities of inaccurate measurements.

Accordingly, it is an object of my invention to provide a device which will measure and record the results therefrom with a minimum effort and with maximum accuracy. It is a further object to provide a measuring device which will evince a physical manifestation of the results produced by the measurement, said manifestations being permanent in nature. An additional object of my invention is to manufacture a depth gauge which has incorporated in combination therewith a means for making a permanent record of the measurements provided by such gauge.

The accompanying drawing presents a specific embodiment of my invention.

Figures 5 and 6 are fragmentary views presenting alternative embodiments of the marking element employed in conjunction with the punch member of the apparatus.

Figure 7 is an example of one type of a calibrated recording card employed when the gauge is utilized as a means for measuring the depth of tire tread patterns.

Figure 8 is a rear perspective view of the component members employed in the instant invention showing an alternative embodiment of the base member and an alternative means of attaching the measuring slide to the base member.

Figure 1:
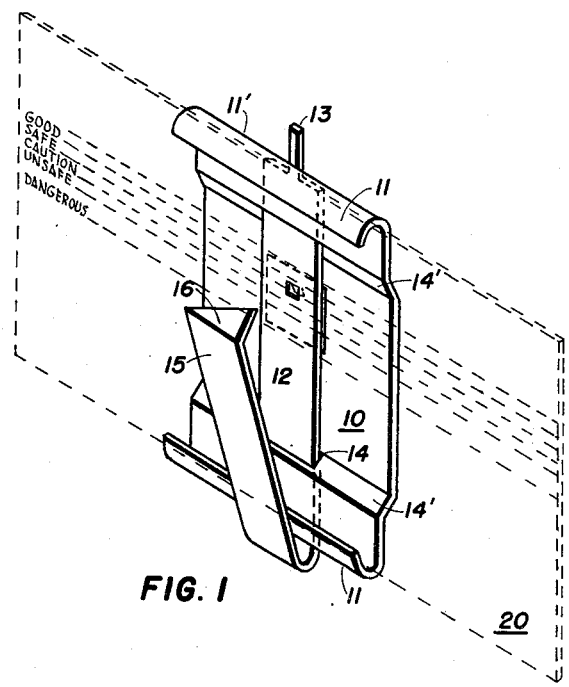
Figure 1 shows a perspective view of one arrangement of the component members employed in the instant invention in combination with a recording strip card having indicia printed thereon for use in recording the measurement thereby illustrating the manner in which measuring and marking elements cooperate with the card measuring element.

In the following description an apparatus definitive of my invention will be discussed with reference to its application as a tire tread gauge. It is to be understood however that this application is merely illustrative and non-limiting. Likewise the particular and specific embodiment of the invention presented by the accompanying drawing should be considered as illustrative and it is not intended that the essence and spirit of the invention be limited thereto.

Referring to the drawing it will be seen that the specific embodiment presented therein comprises a base member 10 having a means for slidably mounting a recording strip such as a suitably calibrated card thereon. This means may take the form of flanged elements such as the flanged elements 11 or any other suitable expedient for holding the recording strip in contiguous relation to the base member 10 but allowing transverse, sliding movement thereon. The base member 10 may be fabricated from any material, metallic or plastic, which will provide a sufficiently rigid structure. Slidably and longitudinally mounted on the base member 10 is the measuring slide 12. The terminal end of measuring slide 12 is formed to provide a feeler element 13 of a suitable size and configuration as to be insertable in the groove or depression being measured. In the specific embodiment presented herein the measuring slide 12 is fitted to the base member 10 by means of guide slots 14 placed within the offsets 14' formed in the base member 10. If a base member is provided with a plane web section intermediate the flanged elements 11 the measuring slide 12 may be fitted thereto by means of brackets 23 affixed to the underside of the base member which form appropriate slideways, as illustrated by Figure 8. In integral combination with the measuring slide 12 is the punch member 15. This punch member has affixed adjacent its free end a punch element 16 which may be either solid and pointed or hollow and sharp-edged. This punch element 16 is affixed to the punch member 15 in such a manner as to register with a die or matrix 17 suitably located in the measuring slide or base member. Matrix 17 is preferably an aperture in base member 10 when measuring slide 12 is mounted on the underside of the base member as shown in Figure 8.

Figure 2:
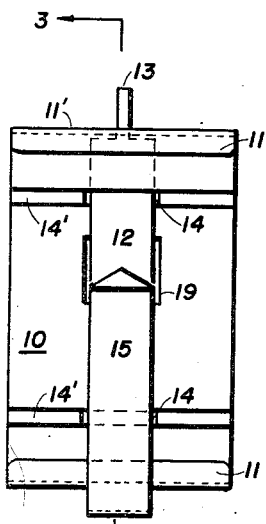
Figure 2 is a front elevational view of the device shown in Figure 1.
Figure 3:
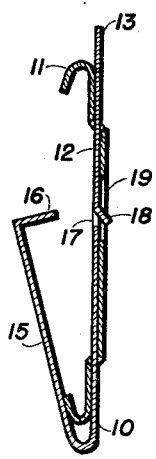
Figure 3 represents a sectional elevation on the plane of line 3—3 of Figure 2.
Figure 4:
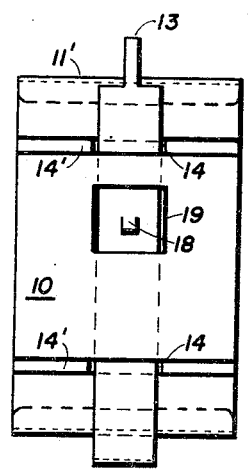
Figure 4 illustrates a rear elevational view of the same device.

In the device shown in Figures 1–6 the measuring slide and punch member are formed from a single strip of a rigid material which has sufficient elasticity to provide a springed action for the punch member. If separate components are utilized as the measuring slide and punch member they may be integrally united in spaced overlapping relationship by means of a pivoted or hinged joint, in which instance the resilient action of the punch member is obtained by interposing a coil spring or a suitably shaped strip of spring steel at the junction of the measuring slide and punch member. In place of the punch element 16 a non-perforating means may be employed as the depth registering element such as a horizontal slot 21 placed in the punch member as shown in Figure 5 which functions as a guide for a pencil or other suitable marking means or an inked stamp pad 22 illustrated by Figure 6. Another example of a non-perforating marking means takes the form of a punch member in the form of a pivoted compass arm having a marking means affixed adjacent its terminal end. As a provision for limiting or arresting the extent of the sliding motion of the measuring slide 12 a boss 18 may be fitted in such a manner as to ride in a longitudinal slot 19 provided in the base member 10. The length of this slot 19 is determined by the amount of free motion so desired. Although not shown a positive stop may be employed to maintain temporarily, by frictional contact between measuring slide and base member, the relationship between these respective elements of the gauge created by the measuring operation. In the device illustrated the frictional engagement of the slide 12 with the front and back surfaces of member 10 is sufficient to hold the slide in any position to which it is moved.

In its application as a tire tread depth gauge my invention has a specific use. Other than as a means for determining the resale or trade-in value of an automobile tire as determined by the amount of remaining tread pattern the instrument may be used to determined when sufficient wear has developed in the road engaging surface of the automobile tire so as to warrant the purchase of replacement units. Automobile tire tread patterns generally consist of circumferential grooves placed in the road engaging surface of the tire forming a plurality of continuous running ribs. The pattern of the tire tread gauge is determined by the depth, cross-sectional form and configuration of these tread design grooves in the road engaging surface of the tire. This tread pattern in the running surface of the tire provides traction for the rear wheels, steering control for the front wheels and resistance to skid and side-slip on all wheels. It is therefore incumbent upon the automobile operator to ascertain whether or not the design grooving is performing its designed function. For maximum safety it is necessary to determine whether or not the amount of tire tread pattern which is remaining is sufficient. This may be readily determined and a permanent record be made of the measurement by one embodiment of my invention. In applying the instrument as a tire tread gauge the shoulder 11' of the base member 10 is placed transversely and tangentially to the road engaging surface of the automobile tire, and the feeler element 13 placed within a selected circumferential groove of the tread pattern. The measuring slide 12 is moved so that the end of the feeler element 13 will rest on the bottom of the selected groove. A recording strip such as the paper card 20 illustrated in Figure 7 which has been slidably inserted in the base member 10 and held in place by flanges 11 is moved into a position relative to that area of the card allocated to recording the condition of a particular tire. The card is also calibrated with suitable relative indicia to indicate the condition of the tread pattern. When the extremity of the feeler element 13 rests upon the bottom of the groove forming the tire tread pattern this automatically brings the punch element 16 into a position relative to the appropriate indicia imprinted upon the recording strip which indicates the amount of tread remaining in relative terms of safety. The lever arm of punch member 15 is depressed and the punch element 16 brought into contact with the card. When the punch element is in contact with the card sufficient force is applied to the punch member 15 so that the punch element 16 enters into the complementary matrix 17 formed in the measuring slide. This punch action will penetrate the card thereby leaving a permanent indication in the form of a perforation which records the condition of the tread pattern of the automobile tire so measured. The remaining tires on the vehicle may be then measured and separate records indicated on the same card may be provided by displacing the card a sufficient distance away from the previous recording so that a clear presentation of the condition of all the tires measured may be indicated on the same recording card. The variants in depth of the tire tread pattern found in the products obtained from different manufacturers is not important in the measurement as it is the amount of tire tread pattern that remains which determines its value in resale or its safe or unsafe condition.

From the above described application as a tire tread gauge it is readily seen that my invention may be employed in connection with other measuring and recording operations. It is only necessary to provide a card for recording the results provided by the instrument which is suitably calibrated in correlation to the measuring operation which is desired to be recorded. It has already been pointed out that this invention may be used to minimize errors that may occur in interpretating the readings of an instrument by providing a recording of the measurement which may be scrutinized. It also has application in production control methods as an indicator wherein a permanent record is made of the operations performed by a machine. This record thus prepared is then studied and the trend of the operation which is indicated by the variations in measurement as the number of operations performed by the machine increases is used as a guide in resetting or recalibrating the machine employed thereby preventing the machine from being operated for too long a period without adjustment which would result in the production of products which were unacceptable as not meeting specifications. Additional applications should be apparent to those skilled in the art. It is also apparent that changes in form, proportion, and details may be employed to modify the specific embodiment of my invention presented herein without departing from the principle involved.

I claim:

1. A depth indicating and recording apparatus comprising a base member, said base member being adapted to hold transversely slidable a recording strip element in contiguous relation thereto, a depth indicating member consisting of a feeler element and a shank, said shank being longitudinally and slidably mounted on said base member, a punch member superposed upon said depth indicating member and pivotably mounted to the shank of said depth indicating member on an axis transverse to said shank, a marking means affixed adjacent to the free end of said punch member, said marking means overlying and coacting with said base member.

2. An apparatus in accordance with claim 1 in which the said marking means consists of a punch, said punch registering with a die suitably positioned in said shank of said depth indicating member.

3. An apparatus in accordance with claim 1 in which the said marking means consists of a punch, said punch registering with a die suitably positioned in the said base member.

4. An apparatus in accordance with claim 1 in which the said marking means consists of an imprinting stamp.

5. An apparatus in accordance with claim 1 in which the said marking means comprises a slotted horizontal guide.

6. A depth measuring and recording gauge comprising a base member having flanged, parallel, horizontal edges, a measuring slide consisting of a slide section and feeler element, said measuring slide being longitudinally and slidably mounted upon said base member, a springed punch member overlapping said measuring slide, a punch element affixed adjacent to the free end of said punch member so as to register with a matrix disposed in the slide section of said measuring slide, said measuring slide and punch member being manufactured from a unitary strip having a reverse bend intermediate the feeler element and punch element affixed adjacent the extremities of said strip to form an open loop, one leg of said strip forming the said measuring slide and the other leg forming said springed punch member.

7. A depth measuring and recording device comprising a base member having flanged, parallel, horizontal edges, said horizontal edges being extended upwardly and inwardly providing horizontal grooves, and an offset web intermediate the said flanged edges, horizontal slots disposed in said offsets of said base member and a longitudinal slot positioned in the web section of said base member, a measuring slide consisting of a slide section and a feeler element, said slide section passing through said horizontal slots and supported upon a slideway formed by said offset web section, a boss extending from said measuring slide into and registering with said longitudinal slot in said base member thereby limiting the longitudinal motion of the measuring slide to the extent of said longitudinal slot, a springed punch member integrally united with said measuring slide, said punch member having a punch element affixed thereto in a position complementary to a matrix disposed in the slide section of said measuring slide.

8. A device in accordance with claim 7 in which the said downwardly depending boss is an integral part of the said measuring slide and obtains from the removal of the excess material from the said measuring slide in the formation of said matrix within the slide section of said measuring slide.

9. A depth indicating and recording apparatus comprising a base member, a recording strip element transversely and slidably mounted on said base member in contiguous relation thereto, a depth indicating member consisting of a feeler element and a shank, said shank being longitudinally and slidably mounted on said base member, a punch member superposed upon said depth indicating member and pivotably mounted to the shank of said depth indicating member on an axis transverse to said shank, a marking means affixed adjacent to the free end of said punch member, said marking means overlying and coacting with said base member.

PAUL E. HEAL.

References Cited in the file of this patent

UNITED STATES PATENTS

| Number | Name | Date |
|---|---|---|
| 355,764 | Gregory | Jan. 11, 1887 |
| 888,377 | Wood | May 19, 1908 |
| 1,172,810 | Lewandoski | Feb. 22, 1916 |
| 1,601,407 | Murray | Sept. 28, 1926 |
| 2,408,595 | Beard | Oct. 1, 1946 |